US012647230B2

(12) United States Patent
Wang et al.

(10) Patent No.: US 12,647,230 B2
(45) Date of Patent: Jun. 2, 2026

(54) SYNCHRONIZATION SIGNAL BLOCK TRANSMISSION METHOD AND APPARATUS, DEVICE, AND STORAGE MEDIUM

(71) Applicant: VIVO MOBILE COMMUNICATION CO., LTD., Dongguan (CN)

(72) Inventors: Yong Wang, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 444 days.

(21) Appl. No.: 18/302,089

(22) Filed: Apr. 18, 2023

(65) Prior Publication Data

US 2023/0261825 A1      Aug. 17, 2023

Related U.S. Application Data

(63) Continuation of application No. PCT/CN2021/125028, filed on Oct. 20, 2021.

(30) Foreign Application Priority Data

Oct. 22, 2020      (CN) .......................... 202011144254.2

(51) Int. Cl.
*H04L 5/00* (2006.01)
*H04W 48/08* (2009.01)

(52) U.S. Cl.
CPC ........... *H04L 5/0048* (2013.01); *H04W 48/08* (2013.01)

(58) Field of Classification Search
None
See application file for complete search history.

(56) References Cited

U.S. PATENT DOCUMENTS

| | | |
|---|---|---|
| 2013/0142136 A1 | 6/2013 | Pi et al. |
| 2019/0166611 A1 | 5/2019 | Noh et al. |
| 2019/0173199 A1 | 6/2019 | Takei |
| 2020/0007197 A1 | 1/2020 | Kang |
| 2020/0053673 A1 | 2/2020 | Reial et al. |

(Continued)

FOREIGN PATENT DOCUMENTS

| | | |
|---|---|---|
| CN | 109309955 A | 2/2019 |
| CN | 110419182 A | 11/2019 |

(Continued)

OTHER PUBLICATIONS

European Patent Office, Extended European Search Report issued in corresponding Application No. EP 21882061 mailed Mar. 12, 2024.

(Continued)

*Primary Examiner* — Hong S Cho

(57) ABSTRACT

This application discloses a synchronization signal block transmission method and apparatus, a device, and a storage medium. The method includes: sending a first synchronization signal block in a first polarization direction on a first transmission occasion; and sending a second synchronization signal block in a second polarization direction after a first time interval; where the first polarization direction is different from the second polarization direction, and the first synchronization signal block and the second synchronization signal block contain the same information.

17 Claims, 4 Drawing Sheets

| Slot# 0 | | | | Slot# 1 | | | | Slot# 2 | | | | Slot# 3 | | |
|---|---|---|---|---|---|---|---|---|---|---|---|---|---|---|
| SSB# 0 | SSB# 1 | | SSB# 2 | SSB# 3 | | SSB# 0 | SSB# 1 | | SSB# 2 | SSB# 3 | | | | |
| LHCP | LHCP | | LHCP | LHCP | | RHCP | RHCP | | RHCP | RHCP | | | | |

0 1 2 3 4 5 6 7 8 9 10 11 12 13 | 14 15 16 17 18 19 20 21 22 23 24 25 26 27 | 28 29 30 31 32 33 34 35 36 37 38 39 40 41 | 42 43 44 45 46 47 48 49 50 51 52 53 54 55 | 56

(56)                    References Cited

U.S. PATENT DOCUMENTS

| | | | |
|---|---|---|---|
| 2020/0067755 A1 | 2/2020 | Pan et al. | |
| 2022/0109490 A1* | 4/2022 | Ma | H04W 72/20 |
| 2023/0232391 A1* | 7/2023 | Zhou | H04L 5/0091 |
| | | | 370/329 |
| 2023/0268981 A1* | 8/2023 | Park | H04L 5/0051 |
| | | | 370/316 |

FOREIGN PATENT DOCUMENTS

| | | |
|---|---|---|
| CN | 111585729 A | 8/2020 |
| WO | 2018/204351 A1 | 11/2018 |
| WO | 2020/192892 A1 | 10/2020 |

OTHER PUBLICATIONS

3GPP TSG-RAN WG1 Meeting #102-e, R1-2006466, e-Meeting, Aug. 17-28, 2020. On other enhancements for NTN.

China National Intellectual Property Administration, International Search Report issued in corresponding Application No. PCT/CN2021/125028 mailed Dec. 22, 2021.

VIVO. "Discussion on other aspects for NR-NTN" 3GPP TSG RAN WG1 #103-e. R1-2007663. e-Meeting, Oct. 26-Nov. 13, 2020.

* cited by examiner

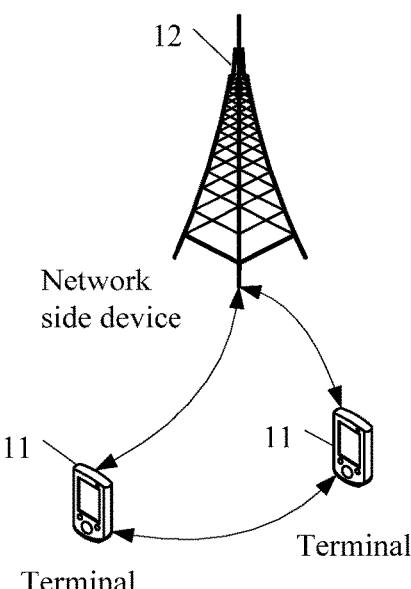

Network
side device 11                    11

Terminal

Terminal

FIG. 1

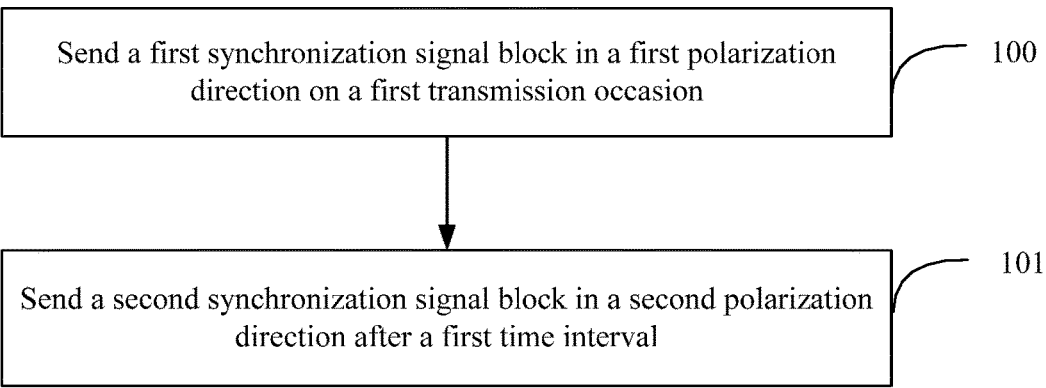

Send a first synchronization signal block in a first polarization direction on a first transmission occasion    —— 100

Send a second synchronization signal block in a second polarization direction after a first time interval    —— 101

FIG. 2

| Slot# 0 | Slot# 1 | Slot# 2 | Slot# 3 |
|---|---|---|---|
| 0 1 2 3 4 5 6 7 8 9 10 11 12 13 | 14 15 16 17 18 19 20 21 22 23 24 25 26 27 | 28 29 30 31 32 33 34 35 36 37 38 39 40 41 | 42 43 44 45 46 47 48 49 50 51 52 53 54 55 56 |

SSB# 0    SSB# 1    SSB# 2    SSB# 3    SSB# 0    SSB# 1    SSB# 2    SSB# 3
LHCP      LHCP      LHCP      LHCP      RHCP      RHCP      RHCP      RHCP

FIG. 3

| Slot# 0 | Slot# 1 | Slot# 2 | Slot# 3 |
|---|---|---|---|
| 0 1 2 3 4 5 6 7 8 9 10 11 12 13 | 14 15 16 17 18 19 20 21 22 23 24 25 26 27 | 28 29 30 31 32 33 34 35 36 37 38 39 40 41 | 42 43 44 45 46 47 48 49 50 51 52 53 54 55 56 |

SSB# 0    SSB# 1    SSB# 2    SSB# 3    SSB# 0    SSB# 1    SSB# 2    SSB# 3
RHCP      RHCP      RHCP      RHCP      LHCP      LHCP      LHCP      LHCP

FIG. 4

SYNCHRONIZATION SIGNAL BLOCK TRANSMISSION METHOD AND APPARATUS, DEVICE, AND STORAGE MEDIUM

CROSS-REFERENCE TO RELATED APPLICATIONS

This application is a continuation of International Application No. PCT/CN2021/125028, filed on Oct. 20, 2021, which claims priority to Chinese Patent Application No. 202011144254.2, filed on Oct. 22, 2020 in China, which is incorporated herein by reference in its entirety.

TECHNICAL FIELD

This application belongs to the technical field of communication, and specifically, relates to a synchronization signal block transmission method and apparatus, a device, and a storage medium.

BACKGROUND

A base station needs to send a synchronization signal block (SSB, also called SS/PBCH block) for a terminal to perform synchronization, obtain system information, perform measurement and evaluation, and so on.

However, in an initial downlink synchronization process, when the terminal is in a beam coverage area of a certain polarization direction, if the polarization direction is not used or cannot be used for a receiving antenna of the terminal, the terminal may not be able to receive an SSB signal in the beam coverage area; and if the terminal does not know the polarization direction used in the beam coverage area, the terminal can only blindly detect SSB signals in different polarization directions on different transmission occasions, which results in a long SSB blind detection time. Therefore, in the current related art, when the polarization direction is unknown, there may be a long SSB blind detection time, and it is even impossible to ensure that the terminal receives a synchronization signal block from an unknown polarization direction.

SUMMARY

Embodiments of this application provide a synchronization signal block transmission method and apparatus, a device, and a storage medium.

According to a first aspect of the present disclosure, a synchronization signal block transmission method is provided, applied to a network side device, and the method includes:

sending a first synchronization signal block in a first polarization direction on a first transmission occasion; and sending a second synchronization signal block in a second polarization direction after a first time interval;

where the first polarization direction is different from the second polarization direction, and the first synchronization signal block and the second synchronization signal block contain the same information.

According to a second aspect of the present disclosure, a synchronization signal block transmission method is provided, applied to a terminal, and the method includes:

receiving a first synchronization signal block on a first transmission occasion; and/or receiving a second synchronization signal block on a second transmission occasion;

where the first synchronization signal block and the second synchronization signal block contain the same information, a polarization direction of the first synchronization signal block is different from a polarization direction of the second synchronization signal block, and there is a first time interval between the first transmission occasion and the second transmission occasion.

According to a third aspect of the present disclosure, a synchronization signal block transmission apparatus is provided, which includes:

a first sending unit, configured to send a first synchronization signal block in a first polarization direction on a first transmission occasion; and a second sending unit, configured to send a second synchronization signal block in a second polarization direction after a first time interval;

where the first polarization direction is different from the second polarization direction, and the first synchronization signal block and the second synchronization signal block contain the same information.

According to a fourth aspect of the present disclosure, a synchronization signal block transmission apparatus is provided, which includes:

a receiving unit, configured to receive a first synchronization signal block on a first transmission occasion; and/or configured to receive a second synchronization signal block on a second transmission occasion;

where the first synchronization signal block and the second synchronization signal block contain the same information, a polarization direction of the first synchronization signal block is different from a polarization direction of the second synchronization signal block, and there is a first time interval between the first transmission occasion and the second transmission occasion.

According to a fifth aspect of the present disclosure, a network side device is provided. The network side device includes a processor, a memory, and a program or an instruction that is stored in the memory and that can be run on the processor, where when the program or the instruction is executed by the processor, the steps of the method in the first aspect are implemented.

According to a sixth aspect of the present disclosure, a terminal is provided. The terminal includes a processor, a memory, and a program or an instruction that is stored in the memory and that can run on the processor, where when the processor or the instruction is executed by the processor, the steps of the method in the second aspect are implemented.

According to a seventh aspect of the present disclosure, a readable storage medium is provided. The readable storage medium stores a program or an instruction, where when the processor or the instruction is executed by the processor, the steps of the method in the first aspect are implemented or the steps of the method in the second aspect are implemented.

According to an eighth aspect of the present disclosure, a chip is provided. The chip includes a processor and a communications interface, where the communications interface is coupled to the processor, and the processor is configured to run a program or an instruction of a network side device, to implement the method in the first aspect, or the method in the second aspect.

BRIEF DESCRIPTION OF DRAWINGS

FIG. 1 is a block diagram of a wireless communication system to which an embodiment of this application is applicable;

FIG. 2 is a schematic flowchart 1 of a synchronization signal block transmission method according to an embodiment of this application;

FIG. 3 is a schematic diagram 1 of SSB transmission according to an embodiment of this application;

FIG. 4 is a schematic diagram 2 of SSB transmission according to an embodiment of this application;

DESCRIPTION OF EMBODIMENTS

Figures 5, 6, 7, 8:
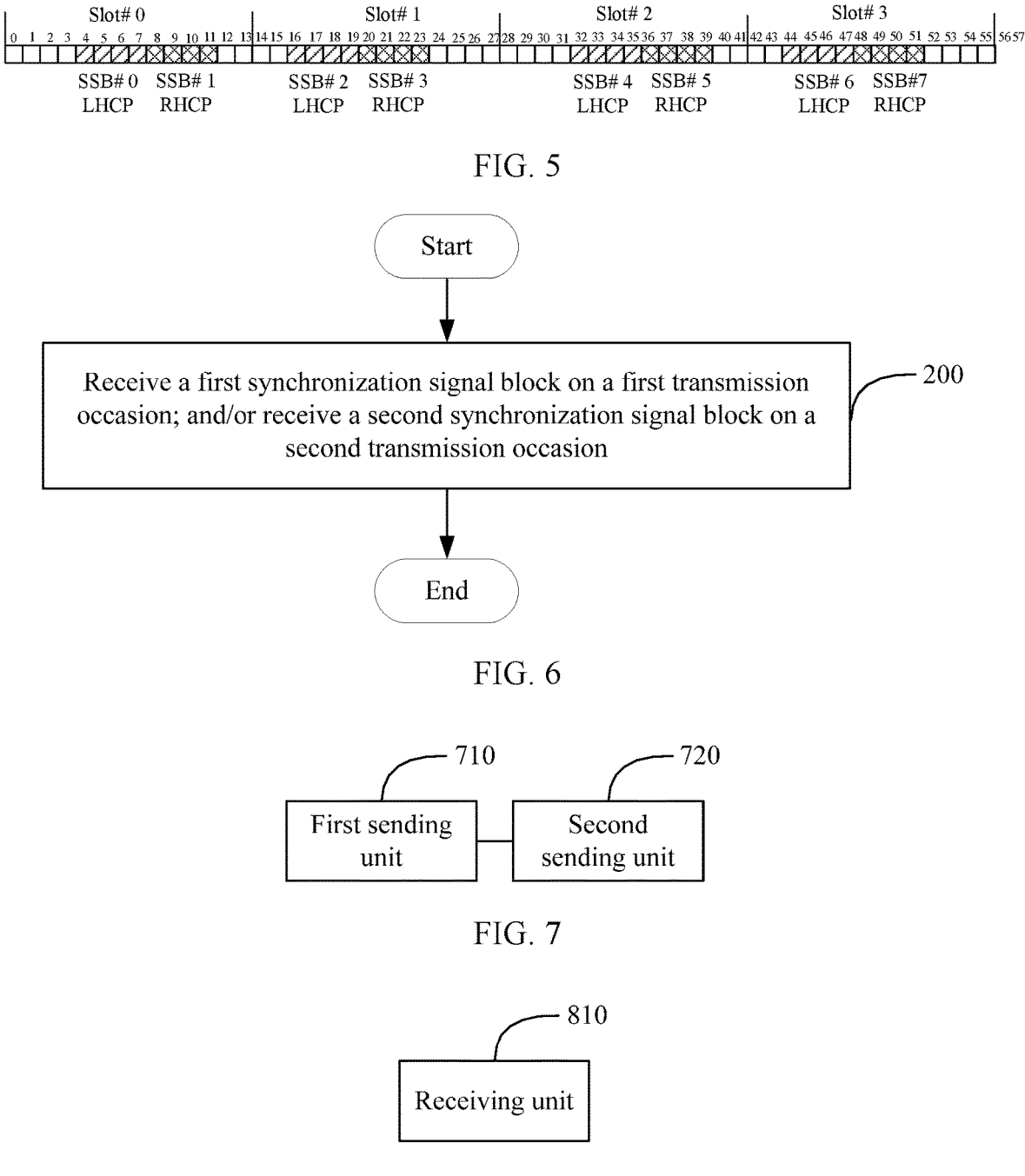
FIG. 5 is a schematic diagram 3 of SSB transmission according to an embodiment of this application.
FIG. 6 is a schematic flowchart 2 of a synchronization signal block transmission method according to an embodiment of this application.
FIG. 7 is a schematic structural diagram 1 of a synchronization signal block transmission apparatus according to an embodiment of this application.
FIG. 8 is a schematic structural diagram 2 of a synchronization signal block transmission apparatus according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that the technology described in the embodiments of this application is not limited to a Long Term Evolution (LTE)/LTE-advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. However, a New Radio (NR) system is described below as an example, and the term NR is used in most of the descriptions, and these technologies can also be used in an application other than an application of the NR system, for example, a 6th generation (6G) communications system.

FIG. 1 is a block diagram of a wireless communications system to which embodiments of this application can be applied. The wireless communications system includes a terminal 11 and a network side device 12. The terminal 11 may also be referred to as a terminal device or user equipment (UE). The terminal 11 may be a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), pedestrian user equipment (PUE), or another terminal side device. The wearable device includes a wristband, earphones, glasses, and the like. The wearable device includes a wristband, earphones, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the following describes in detail a synchronization signal block transmission method and apparatus, a device, and a storage medium in the embodiments of this application based on specific embodiments and application scenarios.

Electromagnetic waves include three forms of linearly polarized waves, circularly polarized waves, and elliptically polarized waves according to polarization methods. Antennas that radiate corresponding polarized waves are called linearly polarized antennas, circularly polarized antennas, and elliptically polarized antennas. Due to the significant advantages of circularly polarized antennas, in satellite communications, the polarization of antennas generally adopts circular polarization. Circular polarization methods include left-hand circularly polarized (LHCP) and right-hand circularly polarized (RHCP). Since the projection of circularly polarized electromagnetic waves induced by any polarized receiving antenna is the same in any direction, circularly polarized waves can be received by any linearly polarized antenna, but the received power is only half that of a similar circularly polarized antenna. When the circularly polarized electromagnetic wave is reflected by an obstacle during propagation, the phenomenon of rotation direction reversal will occur, such as a right-hand circularly polarized (RHCP) signal becomes a left-hand circularly polarized (LHCP) signal, and vice versa. A circularly polarized antenna with a specific rotation direction can only receive energy in that rotation direction, that is, an RHCP antenna can only receive RHCP signals, and an LHCP antenna can only receive LHCP signals.

In the initial downlink synchronization process, when the terminal is in a beam coverage area of a certain polarization direction (such as LHCP), if a polarization direction (such as RHCP) used by a receiving antenna of the terminal is different from the polarization direction, the terminal may not be able to receive an SSB (Synchronization Signal Block) signal in the beam coverage area.

Furthermore, if the terminal does not know the polarization direction used in the beam coverage area, even if the receiving antenna of the terminal supports two polarization directions at the same time, the terminal can only blindly detect SSB signals in different polarization directions on different transmission occasions continuously, which may lead to a long SSB blind detection time. Therefore, the terminal cannot successfully receive a synchronization signal block from an unknown polarization direction within a short time.

When the terminal detects the SSB signal, since a circularly polarized electromagnetic wave may undergo rotation direction reversal during propagation, it cannot be completely determined that the polarization direction used by the terminal is the polarization direction for sending the SSB signal. Furthermore, the terminal cannot determine the polarization direction used by the SSB signal, thus affecting the subsequent transmission process.

In order to solve or at least partly solve the above-mentioned problems, an embodiment of this application proposes a synchronization signal block transmission method.

In order to better understand the embodiments of this application, the design of 5G NR SSB is firstly introduced.

In a first aspect, an NR SSB (Synchronization Signal Block) includes:

PSS (Primary Synchronization Signal): primary synchronization signal, which is an m sequence with a length 127, located in 1st OFDM, and occupies subcarriers 56 to 182.

SSS (Secondary Synchronization Signal): secondary synchronization signal, which is an m sequence with a length 127, located in 3rd OFDM, and occupies subcarriers 56 to 182.

PBCH (Physical Broadcast Channel): physical broadcast channel, which has a bandwidth of 20 RB, occupies 3 OFDM symbols, and includes 4 RBs on both sides of the 2nd, 4nd and 3rd symbols. Given the PBCH Payload 32 bits and the CRC attachment 24 bits, a total of 56 bits of information are transmitted and 432 REs are occupied (QPSK).

PBCH-DMRS (Demodulation Reference Signal): PBCH demodulation pilot, mapped to PBCH at a density of ¼.

PCI (Physical Cell Identifier, Physical Cell Identifier) composition:

$$N_{ID}^{cell} = 3N_{ID}^{(1)} + N_{ID}^{(2)},$$

where $$N_{ID}^{(1)} \in \{0, 1, \ldots, 355\}, N_{ID}^{(2)} \in \{0, 1, 2\},$$

and there are a total of 1008 PCIs.

The SSB period can be configured as {5, 10, 20, 40, 80, 160}ms, and the PBCH TTI (Transmission Time Interval, Transmission Time Interval) is fixed at 80 ms. Each period may contain one or more SSBs, and the SSBs in the same period are sent within a 5 ms window, and these SSBs form a synchronization signal burst set SS burst set.

For a certain frequency domain, assuming that a maximum of $L_{SSB}$ SSBs are sent in one period, $L_{SSB}$ SSBs are transmitted within a 5 ms time window at time domain positions (in the embodiments of this application, referred to as the candidate position) defined by the protocol.

A time window may contain 4, 8 or 64 candidate positions of SSBs. When the frequency is 0 to 3 GHz, it includes 4 candidate positions of SSBs; when the frequency is 3 to 6 GHz, it includes 8 candidate positions of SSBs; and when the frequency is above 6 GHz, it includes 64 candidate positions of SSBs.

Under different SCS (subcarrier spacing), candidate position patterns (pattern) of SSBs may be different, as shown in Table 1.

TABLE 1

| Case | OFDM symbol (index) | $f_c \leq 3$ GHz | 3 GHz < $f_c \leq 6$ GHz | $f_c \geq 6$ GHz |
|---|---|---|---|---|
| Case A: 15 kHz | {2, 8} + 14*n | n = 0, 1<br>idx = 2, 8, 16, 22<br>$L_{SSB}$ = 4 | n = 0, 1, 2, 3<br>idx = 2, 8, 16, 22, 30, 36, 44, 50<br>$L_{SSB}$ = 8 | |
| Case B: 30 kHz | {4, 8, 16, 20} + 28*n | n = 0<br>idx = 4, 8, 16, 20<br>$L_{SSB}$ = 4 | n = 0, 1<br>idx = 4, 8, 16, 20, 32, 36, 44, 48<br>$L_{SSB}$ = 8 | |
| Case C: 30 kHz | {2, 8} + 14*n | n = 0, 1<br>idx = 2, 8, 16, 22<br>$L_{SSB}$ = 4 | n = 0, 1, 2, 3<br>idx = 2, 8, 16, 22, 30, 36, 44, 50<br>$L_{SSB}$ = 8 | |
| Case D: 120 kHz | {4, 8, 16, 20} + 28*n | | | n = 0, 1, 2, 3, 5, 6, 7, 8, 10, 11, 12, 13, 15, 16, 17, 18<br>idx = . . .<br>$L_{SSB}$ = 64 |
| Case E: 240 kHz | {8, 12, 16, 20, 32, 36, 40, 44} + 56*n | | | n = 0, 1, 2, 3, 5, 6, 7, 8<br>idx = . . .<br>$L_{SSB}$ = 64 |

In Table 1, n is a slot number, idx is an OFDM symbol index of a candidate position of an SSB, $L_{SSB}$ is a number of candidate positions of SSBs, and $f_c$ is a frequency.

In a second aspect, a PSS sequence is generated using the following formula:

$$d_{PSS}(n) = 1 - 2x(m)$$

$$m = \left(n + 43N_{ID}^{(2)}\right) \bmod 127$$

$$0 \le n < 127$$

The PSS generator polynomial is: $x(i+7)(x(i+4)+x(i)) \bmod 2$, and a PSS sequence initial value is:

[x(6) x(5) x(4) x(3) x(2) x(1) x(0)]=[1 1 1 0 1 1 0]

The SSS is generated using the following formula:

$$d_{SSS}(n) = [1 - 2x_0((n + m_0)\bmod 127)][1 - 2x_1((n + m_1)\bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

The SSS generator polynomial is: $x_0(i+7)=(x_0(i+4)+x_0(i)) \bmod 2$ and an SSS sequence initial value is: $x_1(i+7)=(x_1(i+1)+x_1(i)) \bmod 2$,

[$x_0(6)$ $x_0(5)$ $x_0(4)$ $x_0(3)$ $x_0(2)$ $x_0(1)$ $x_0(0)$]=[0 0 0 0 0 0 1]

[$x_1(6)$ $x_1(5)$ $x_1(4)$ $x_1(3)$ $x_1(2)$ $x_1(1)$ $x_1(0)$]=[0 0 0 0 0 0 1]

FIG. 2 is a schematic flowchart 1 of a synchronization signal block transmission method according to an embodiment of this application. The execution subject of the method is a network side device, and as shown in FIG. 2, the method includes the following steps:

Step 100: Send a first synchronization signal block in a first polarization direction on a first transmission occasion.

It should be noted that the transmission occasion refers to a time domain position of a transmission signal within a time window.

Herein, the first transmission occasion is a time domain position at which the first synchronization signal block SSB is transmitted.

The first transmission occasion may be a candidate SSB transmission occasion (candidate SSB occasion), or may be a transmission occasion for actually sending the SSB.

The candidate SSB transmission occasion is used to indicate time domain positions at which the SSB can be transmitted.

The network side device sends a first synchronization signal block in a first polarization direction on a first transmission occasion.

It can be understood that the first synchronization signal block sent by the network side device carries a polarization direction indicator.

Step 101: Send a second synchronization signal block in a second polarization direction after a first time interval.

Alternatively, after the first time interval, the network side device sends the second synchronization signal block in the second polarization direction.

It can be understood that the second synchronization signal block sent by the network side device carries a polarization direction indicator.

The first polarization direction is different from the second polarization direction, and the first synchronization signal block and the second synchronization signal block contain the same information. It can be understood that the first synchronization signal block and the second synchronization signal block have a corresponding relationship, for example, the first synchronization signal block and the second synchronization signal block indicate that information is partially the same for the terminal to perform synchronization, obtain system information, perform measurement and evaluation, and so on.

The network side device sends the first synchronization signal block in the first polarization direction on the first transmission occasion, and sends the second synchronization signal block in the second polarization direction after the first time interval, and the first synchronization signal block and the second synchronization signal block contain the same information, so that it can be ensured that the terminal successfully receives the SSB within a certain period of time.

For example, if the receiving antenna of the terminal uses the first polarization direction and does not use or cannot use the second polarization direction, the terminal can receive the first synchronization signal block, and cannot receive the second synchronization signal block without rotation direction reversal during electromagnetic wave transmission.

For example, if the receiving antenna of the terminal does not use or cannot use the first polarization direction, but uses the second polarization direction, the terminal cannot receive the first synchronization signal block without rotation direction reversal during electromagnetic wave transmission, but can receive the second synchronization signal block.

For example, if the terminal antenna is a linearly polarized antenna, since the received power is only half that of a similar circularly polarized antenna, that is, there is a 3 dB depolarization loss, the terminal can receive two synchronization signal blocks with different polarization directions and perform certain combination to compensate for the depolarization loss.

For example, if the terminal supports the first polarization direction and the second polarization direction at the same time, the terminal does not need to know in advance whether the first polarization direction corresponds to LHCP or RHCP, and can receive synchronization signal blocks in the first polarization direction and/or the second polarization direction. If the terminal detects the SSB signal, it can decode the SSB signal, and since the SSB signal carries a polarization direction indicator, the polarization direction of the successfully decoded SSB signal can be determined.

In the synchronization signal block transmission method provided by the embodiment of this application, by transmitting the synchronization signal block in different polarization directions on different transmission occasions, the SSB blind detection time can be reduced, ensuring that the terminal successfully receives the SSB signal within a certain period of time.

Optionally, the first polarization direction is left-hand circularly polarized LHCP, and the second polarization direction is right-hand circularly polarized RHCP; or the first polarization direction is right-hand circularly polarized RHCP, and the second polarization direction is left-hand circularly polarized LHCP.

Optionally, the first time interval is determined in a predefined or preconfigured manner.

It can be understood that numbers of SSB candidate positions in a time window corresponding to different subcarrier spacings and carrier frequency ranges are different, and the time interval of sending the first synchronization signal block and the second synchronization signal block can be determined in a predefined or preconfigured manner according to the number of SSB candidate positions.

In case A of 15 kHz SCS, assuming that the carrier frequency is less than 3 GHz, $L_{SSB}=4$, the OFDM symbol index idx of the SSB candidate position is 2, 8, 16, 22. As shown in FIG. 3, FIG. 3 is a schematic diagram 1 of SSB transmission according to an embodiment of this application. In a 5 ms half frame, the 4 candidate SSBs in slot #0 and slot #1 use left-hand circularly polarized LHCP, and the 4 candidate SSBs in slot #2 and slot #3 use right-hand circularly polarized RHCP. In this case, the corresponding first time interval is 2 slots/28 OFDM symbols, and the corresponding first SSB signal and the second SSB signal have the same SSB index. It can be understood that, when idx=2, SSB #0 is sent by LHCP, after the first time interval, when idx=30, SSB #0 is sent by RHCP, when idx=8, SSB #1 is sent by LHCP, and after the first time interval, when idx=36, SSB #1 is sent by RHCP, and so on. Details are not described.

In case A of 15 kHz SCS, assuming that the carrier frequency is less than 3 GHz, $L_{SSB}=4$, the OFDM idx of the SSB is 2, 8, 16, 22. As shown in FIG. 4, FIG. 4 is a schematic diagram 2 of SSB transmission according to an embodiment of this application. In a 5 ms half frame, the 4 candidate SSBs in slot #0 and slot #1 use right-hand circularly polarized RHCP, and the 4 candidate SSBs in slot #2 and slot #3 use left-hand circularly polarized LHCP. In this case, the corresponding first time interval is 2 slots/28 OFDM symbols, and the corresponding first SSB signal and the second SSB signal have the same SSB index. It can be understood that, when idx=2, SSB #0 is sent by RHCP, after the first time interval, when idx=30, SSB #0 is sent by LHCP, when idx=8, SSB #1 is sent by RHCP, and after the first time interval, when idx=36, SSB #1 is sent by LHCP, and so on. Details are not described.

It should be noted that, if the first time interval is determined, the transmission relationship between the first synchronization signal block and the second synchronization signal block is determined. If the terminal using LHCP successfully demodulates the SSB after receiving the SSB, but the polarization direction indicator indicates that the SSB is an RHCP SSB, the terminal can implicitly know where the LHCP SSB is sent. In this case, the terminal can choose to receive the LHCP SSB again at the corresponding location, so as to obtain other related information.

Optionally, the size of the first time interval is one of the following:
   a positive integer greater than or equal to 0, where a unit is slot, subframe, or orthogonal frequency division multiplexing OFDM symbol;
   a radio frame;
   one of {5 ms, 10 ms, 20 ms, 40 ms, 80 ms, 160 ms}; and
   a configured SSB period.

Optionally, the polarization direction of the first synchronization signal block and the polarization direction of the second synchronization signal block are indicated by at least one of the following:
   primary synchronization signal PSS;
   secondary synchronization signal SSS;
   MIB;
   SSB index; and
   some bits in 8-bit physical layer information carried by a PBCH, where the some bits include: half frame indicator HFI, or other bits other than information bits carrying a system frame number SFN and the HFI.

It should be noted that the manner of carrying the polarization direction does not distinguish between the first synchronization signal block and the second synchronization signal block, that is, the polarization direction of the first synchronization signal block and the polarization direction of the second synchronization signal block are indicated in the same way.

In some optional embodiments, that the polarization direction of the first synchronization signal block and the polarization direction of the second synchronization signal block are indicated by a primary synchronization signal PSS includes:
   when the PSS is generated, different PSS generator polynomials correspond to different polarization directions for indication; or when the PSS is generated, different PSS sequence initial values correspond to different polarization directions for indication.
   (1) When PSS is generated, different PSS generator polynomials correspond to different polarization directions for indication.

Alternatively, in an embodiment of this application, the generator polynomial used by the PSS in the LHCP SSB is $x^{\wedge}7+x^{\wedge}4+1$, and the generator polynomial used by the PSS in the RHCP SSB is $x^{\wedge}7+x+1$, that is:
   a sequence generation formula of the LHCP PSS is:

$$d_{PSS}(n) = 1 - 2x(m)$$

$$m = \left(n + 43N_{ID}^{(2)}\right) \bmod 127$$

$$0 \le n < 127$$

where the generator polynomial of LHCP PSS is: $x(i+7)=(x(i+4)+x(i)) \bmod 2$,
and an LHCP PSS sequence initial value is:
$[x(6)\ x(5)\ x(4)\ x(3)\ x(2)\ x(1)\ x(0)]=[1\ 1\ 1\ 0\ 1\ 1\ 0]$.
a sequence generation formula of the RHCP PSS after modification is:

$$d_{PSS}(n) = 1 - 2x(m)$$

$$m = \left(n + 43N_{ID}^{(2)}\right) \bmod 127$$

$$0 \le n < 127$$

where the generator polynomial of RHCP PSS is: $x(i+7)=(x(i+1)+x(i)) \bmod 2$,
and an RHCP PSS sequence initial value is:
$[x(6)\ x(5)\ x(4)\ x(3)\ x(2)\ x(1)\ x(O)]=[1\ 1\ 1\ 0\ 1\ 1\ 0]$
In another embodiment, the generator polynomial used by the PSS in the LHCP SSB may be $x^{\wedge}7+x+1$, while the generator polynomial used by the PSS in the RHCP SSB is $x^{\wedge}7+x^{\wedge}4+1$.
   (2) when the PSS is generated, different PSS sequence initial values correspond to different polarization directions for indication.

For example, the sequence initial value used by PSS in LHCP SSB is $[x(6)\ x(5)\ x(4)\ x(3)\ x(2)\ x(1)\ x(0)]=[1\ 1\ 1\ 0\ 1\ 1\ 0]$, while the sequence initial value used by PSS in RHCP SSB is $[x(6)\ x(5)\ x(4)\ x(3)\ x(2)\ x(1)\ x(0)]=[0\ 0\ 0\ 0\ 0\ 0\ 1]$, and vice versa.

In some optional embodiments, that the polarization direction of the first synchronization signal block and the polarization direction of the second synchronization signal block are indicated by a secondary synchronization signal SSS includes:

when the SSS is generated, different SSS sequence initial values correspond to different polarization directions for indication.

Alternatively, in the current protocol, the SSS sequence initial value is:

$[x_0(6)\ x_0(5)\ x_0(4)\ x_0(3)\ x_0(2)\ x_0(1)\ x_0(0)]=[0\ 0\ 0\ 0\ 0\ 0\ 1]$
$[x_1(6)\ x_1(5)\ x_1(4)\ x_1(3)\ x_1(2)\ x_1(1)\ x_1(0)]=[0\ 0\ 0\ 0\ 0\ 0\ 1]$
a PSS sequence initial value is:
$[x(6)\ x(5)\ x(4)\ x(3)\ x(2)\ x(1)\ x(0)]=[1\ 1\ 1\ 0\ 1\ 1\ 0]$ In the embodiments of this application, a sequence initial value used by an SSS in the LHCP SSB can be:

$[x_0(6)\ x_0(5)\ x_0(4)\ x_0(3)\ x_0(2)\ x_0(1)\ x_0(0)]=[0\ 0\ 0\ 0\ 0\ 0\ 1]$
$[x_1(6)\ x_1(5)\ x_1(4)\ x_1(3)\ x_1(2)\ x_1(1)\ x_1(0)]=[0\ 0\ 0\ 0\ 0\ 0\ 1]$
a sequence initial value used by an SSS in the RHCP SSB is:
$[x_0(6)\ x_0(5)\ x_0(4)\ x_0(3)\ x_0(2)\ x_0(1)\ x_0(0)]=[1\ 1\ 1\ 0\ 1\ 1\ 0]$
$[x_1(6)\ x_1(5)\ x_1(4)\ x_1(3)\ x_1(2)\ x_1(1)\ x_1(0)]=[1\ 1\ 1\ 0\ 1\ 1\ 0]$
and vice versa.

Alternatively, in the embodiments of this application, a sequence initial value used by an SSS in the LHCP SSB is:

$[x_0(6)\ x_0(5)\ x_0(4)\ x_0(3)\ x_0(2)\ x_0(1)\ x_0(0)]=[1\ 1\ 1\ 0\ 1\ 1\ 0]$
$[x_1(6)\ x_1(5)\ x_1(4)\ x_1(3)\ x_1(2)\ x_1(1)\ x_1(0)]=[0\ 0\ 0\ 0\ 0\ 0\ 1]$
a sequence initial value used by an SSS in the RHCP SSB is:
$[x_0(6)\ x_0(5)\ x_0(4)\ x_0(3)\ x_0(2)\ x_0(1)\ x_0(0)]=[0\ 0\ 0\ 0\ 0\ 0\ 1]$
$[x_1(6)\ x_1(5)\ x_1(4)\ x_1(3)\ x_1(2)\ x_1(1)\ x_1(0)]=[1\ 1\ 1\ 0\ 1\ 1\ 0]$
and vice versa.

In some optional embodiments, the polarization direction of the first timing signal block and the polarization direction of the second synchronization signal block are indicated by a MIB, including:

1-bit spare bit in the MIB is used for indication, or different values of the PDCCH-ConfigSIB1 field correspond to different polarization directions for indication.

Alternatively, in the current protocol, there is a 1-bit spare bit in the MIB as follows:

Alternatively, the polarization direction of the first synchronization signal block and the polarization direction of the second synchronization signal block adopt different index sets, for example, an even index corresponds to LHCP and an odd index corresponds to RHCP, that is, the least significant bit LSB of the SSB index is used to distinguish.

For example, in case B of 30 kHz SCS, assuming that the carrier frequency is greater than 3 GHz and less than 6 GHz, $L_{SSB}=8$, where idx=4, 8, 16, 20, 32, 36, 44, 48. As shown in FIG. 5, FIG. 5 is a schematic diagram 3 of SSB transmission according to an embodiment of this application. According to the SSB transmission method, a possible transmission mode is as follows: on an even SSB index, LHCP is used to send the SSB, and on an odd SSB index, RHCP is used to send the SSB. At this time, the first time interval has a size of 4 OFDM symbols.

It should be noted that distinguishing by the least significant bit LSB of the SSB index affects the initialization of a DMRS sequence.

In some optional embodiments, the polarization direction of the first synchronization signal block and the polarization direction of the second synchronization signal block are indicated by some bits in 8-bit physical layer information carried by a PBCH, where the some bits include: half frame indicator HFI, or other bits other than information bits carrying a system frame number SFN and the HFI.

Alternatively, in the current protocol, the 8-bit physical layer information carried by a PBCH is: $\bar{a}_{\bar{A}}$, $\bar{a}_{\bar{A}+1}$, $\bar{a}_{\bar{A}+2}$, $a_{\bar{A}+3}$, . . . , $+\bar{a}_{\bar{A}+7}$.

$\bar{a}_{\bar{A}}$, $\bar{a}_{\bar{A}+1}$, $\bar{a}_{\bar{A}+2}$, $\bar{a}_{\bar{A}+3}$ correspond to the 4th, 3rd, 2nd, 1st LSB (least significant bits, least significant bit) of an SFN (System Frame Number, system frame number).

$\bar{a}_{\bar{A}+4}$ is a half frame indicator HFI (half frame indicator).

If the number of SSB candidate positions is $L_{SSB}=64$, $a_{\bar{A}+5}$, $\bar{a}_{\bar{A}+6}$, $\bar{a}_{\bar{A}+7}$ are the 6th, 5th, and 4th bits of the SSB index; otherwise, $\bar{a}_{\bar{A}+5}$ is the MSB (Most Significant Bit, the most significant bit) of $k_{SSB}$, and $\bar{a}_{\bar{A}+6}$, $\bar{a}_{\bar{A}+7}$ are reserved bits, where $k_{SSB}$ indicates a number of subcarriers that offset in frequency between the SSB and a common resource block.

In this embodiment of the application, in order to indicate the polarization direction, the LHCP SSB can be fixedly sent

```
MIB ::=                 SEQUENCE {
    systemFrameNumber           BIT STRING (SIZE (6)),
    subCarrierSpacingCommon        ENUMERATED {scs15or60, scs30or120},
    ssb-SubcarrierOffset        INTEGER (0..15),
    dmrs-TypeA-Position         ENUMERATED {pos2, pos3},
    pdcch-ConfigSIB1            PDCCH-ConfigSIB1,
    cellBarred              ENUMERATED {barred, notBarred},
    intraFreqReselection           ENUMERATED {allowed, notAllowed},
    spare               BIT STRING (SIZE (1))
}
```

In the embodiments of this application, the MIB information in the LHCP SSB or the RHCP SSB may respectively carry a polarization direction indicator, and at this time, the contents of the MIB in the LHCP SSB and the RHCP SSB are different. After the terminal successfully decodes the PBCH, it can obtain the polarization direction indicator of the SSB based on the MIB.

The PDCCH-ConfigSIB1 in the MIB may have unused or undefined bits in some cases, and the bits can also be used as a polarization direction indicator.

In some optional embodiments, the polarization direction of the first synchronization signal block and the polarization direction of the second synchronization signal block are indicated by an SSB index.

in the first half of a radio frame in a predefined or preconfigured manner, and the RHCP SSB can be fixedly sent in the second half of a radio frame. That is, the half frame indicator HFI can be used to indicate the polarization direction.

In particular, when $L_{SSB}=4$, the initialization calculation of the DMRS sequence is related to the value of $i_{SSB}$, $\bar{i}_{SSB}=i_{SSB}+4n_{hf}$, $i_{SSB}$ indicates 2 lowest significant bits (LSB) of the SSB index, $n_{hf}$ indicates HFI, $n_{hf}=0$ indicates the first half frame; and $n_{hf}=1$ indicates the second half frame. Therefore, for the DMRS sequence of the PBCH in the LHCP SSB, $\bar{i}_{SSB}=i_{SSB}$ is always used for initial calculation; for the DMRS sequence of the PBCH in the RHCP SSB, $\bar{i}_{SSB}+i_{SSB}+4$ is always used for initial calculation.

On the contrary, in an embodiment, the RHCP SSB may be fixedly sent in the first half of a radio frame, and the LHCP SSB may be fixedly sent in the second half of a radio frame.

Optionally, in order to indicate the polarization direction, the polarization direction can also be carried by other bits other than information bits carrying a system frame number SFN and the HFI in the 8-bit physical layer information carried by the PBCH, including $\bar{a}_{\bar{A}+5}$, $\bar{a}_{\bar{A}+6}$ or $\bar{a}_{\bar{A}+7}$.

For example, when the maximum number $k_{SSB}$ of sub-carriers that offset in frequency between the common resource block and the SSB does not exceed 1 RB, that is, 12 subcarriers, the value range of ssb-SubcarrierOffset in MTB is 0 to 15, and can sufficiently indicate the number of subcarriers that offset. Therefore, $\bar{a}_{\bar{A}+5}$ may not be used to expand the value range of $k_{SSB}$, and $\bar{a}_{\bar{A}+5}$ can be used to indicate the polarization direction.

It can be understood that the polarization direction of the first synchronization signal block and the polarization direction of the second synchronization signal block are indicated by the SSB signal. After receiving the SSB signal, the terminal can determine the polarization direction of the SSB signal by demodulating the SSB signal.

A manner of indicating the polarization direction may affect the specific content of the same information contained in the first synchronization signal block and the second synchronization signal block.

In the synchronization signal block transmission method provided by the embodiments of this application, a polarization direction indicator is carried through SSB transmission, so that the terminal can determine the polarization direction used in the subsequent transmission process.

Optionally, the same information includes at least one of the following:

physical cell identifier PCI;

at least some fields in a master information block MIB;

at least a part of information in 8-bit physical layer information carried by a physical broadcast channel PBCH;

synchronization signal block SSB index; and initial value used for initialization of a PBCH demodulation reference signal DMRS sequence.

It can be understood that at least one of the following content of the first synchronization signal block and the second synchronization signal block is the same:

(1) physical cell identifier PCI.

The physical cell identifier PCI is determined based on both a primary synchronization signal PSS sequence and a secondary synchronization signal SSS sequence.

(2) at least some fields in a master information block MIB (Master Information Block).

For example, at least some fields in the MIB of the first synchronization signal block and the second synchronization signal block are the same. Content of other fields other than a 1-bit spare bit used to indicate the polarization direction may be the same, content of other fields other than a PDCCH-ConfigSIB1 field used to indicate the polarization direction may be the same, content of other fields other than a 1-bit spare bit and a PDCCH-ConfigSIB1 field used to indicate the polarization direction may be the same, or content of all fields of the MIB may be the same.

(3) at least a part of information in 8-bit physical layer information carried by a physical broadcast channel PBCH.

For example, at least a part of information in the 8-bit physical layer information carried by the physical broadcast channel PBCH of the first synchronization signal block and the second synchronization signal block is the same. Bit information $\bar{a}_{\bar{A}}$, $\bar{a}_{\bar{A}+1}$, $\bar{a}_{\bar{A}+2}$, $\bar{a}_{\bar{A}+3}$ other than the bit information used to indicate the polarization direction may be the same, or bit information other than $\bar{a}_{\bar{A}+4}$, $\bar{a}_{\bar{A}+5}$, $\bar{a}_{\bar{A}+6}$, or $\bar{a}_{\bar{A}+7}$ may be the same, or all the bit information in the 8-bit physical layer information may be the same.

(4) synchronization signal block SSB index.

Alternatively, if the SSB index of the first synchronization signal block is the same as the SSB index of the second synchronization signal block, it indicates that the polarization direction of the first synchronization signal block and the polarization direction of the second synchronization signal block are indicated in other manners other than the SSB index.

(5) initial value used for initialization of a PBCH demodulation reference signal DMRS sequence.

Since the initial value used for DMRS sequence initialization is related to the SSB index and the half frame indicator HFI, if the initial value used for the DMRS sequence initialization of the first synchronization signal block is the same as the initial value used for the DMRS sequence initialization of the second synchronization signal block, it indicates that the SSB index of the first synchronization signal block is the same as the SSB index of the second synchronization signal block, and the HFI of the first synchronization signal block is the same as the HFI of the second synchronization signal block.

Optionally, the synchronization signal block transmission method further includes: determining a beam ID or a bandwidth part BWP ID through the polarization direction and/or the SSB index.

Alternatively, in order to reduce interference in the subsequent transmission process, different beam coverage areas may use different frequency ranges and/or different polarization directions. In this case, the network side device needs to indicate the frequency range and/or polarization direction to the corresponding terminal. Therefore, a beam ID or a BWP ID can be determined through the SSB polarization direction indicator and/or the SSB index.

FIG. 6 is a schematic flowchart 2 of a synchronization signal block transmission method according to an embodiment of this application. The execution subject of the method is the terminal. As shown in FIG. 6, the method includes the following steps:

Step 200: Receive a first synchronization signal block on a first transmission occasion; and/or receive a second synchronization signal block on a second transmission occasion.

The first synchronization signal block and the second synchronization signal block contain the same information, a polarization direction of the first synchronization signal block is different from a polarization direction of the second synchronization signal block, and there is a first time interval between the first transmission occasion and the second transmission occasion.

Alternatively, when the terminal antenna is a linearly polarized antenna, since the received power is only half that of a similar circularly polarized antenna, that is, there is a 3 dB depolarization loss, the terminal can receive two synchronization signal blocks in different polarization directions, and perform a certain combination to compensate for the depolarization loss.

When the terminal antenna is a circularly polarized antenna, the terminal receives a first synchronization signal block on a first transmission occasion; and/or receives a second synchronization signal block on a second transmission occasion.

The polarization direction of the first synchronization signal block is the first polarization direction, and the polarization direction of the second synchronization signal block is the second polarization direction.

For example, if the receiving antenna of the terminal uses the first polarization direction and does not use or cannot use the second polarization direction, the terminal can receive the first synchronization signal block, and cannot receive the second synchronization signal block without rotation direction reversal during electromagnetic wave transmission.

For example, if the receiving antenna of the terminal does not use or cannot use the first polarization direction, but uses the second polarization direction, the terminal cannot receive the first synchronization signal block without rotation direction reversal during electromagnetic wave transmission, but can receive the second synchronization signal block.

If the terminal supports the first polarization direction and the second polarization direction at the same time, the terminal does not need to know in advance whether the first polarization direction corresponds to LHCP or RHCP, and can receive synchronization signal blocks in the first polarization direction and/or the second polarization direction. If the terminal detects the SSB signal, it can decode the SSB signal, and since the SSB signal carries a polarization direction indicator, the polarization direction of the successfully decoded SSB signal can be determined.

In the synchronization signal block transmission method provided by the embodiment of this application, by transmitting the synchronization signal block in different polarization directions on different transmission occasions, the SSB blind detection time can be reduced, ensuring that the terminal successfully receives the SSB signal within a certain period of time.

Optionally, the polarization direction of the first synchronization signal block is left-hand circularly polarized LHCP, and the polarization direction of the second synchronization signal block is right-hand circularly polarized RHCP; or the polarization direction of the first synchronization signal block is right-hand circularly polarized RHCP, and the polarization direction of the second synchronization signal block is left-hand circularly polarized LHCP.

Optionally, the same information includes at least one of the following:

physical cell identifier PCI;

at least some fields in master information block MIB information;

at least a part of information in 8-bit physical layer information carried by a physical broadcast channel PBCH;

synchronization signal block SSB index; and initial value used for initialization of a PBCH demodulation reference signal DMRS sequence.

Alternatively, the synchronization signal block transmission method provided by the embodiments of this application is the same as that described in the corresponding embodiment above, and can achieve the same technical effect. The difference is only that the executive body is different. The same part and beneficial effect in this embodiment and the corresponding embodiment above will not be described in detail.

Optionally, the synchronization signal block transmission method further includes:

demodulating the first synchronization signal block and/or the second synchronization signal block; and determining the polarization direction of the first synchronization signal block and/or the polarization direction of the second synchronization signal block based on at least one of the following methods:

primary synchronization signal PSS;

secondary synchronization signal SSS;

MIB;

SSB index; and some bits in 8-bit physical layer information carried by a PBCH, where the some bits include: half frame indicator HFI, or other bits other than information bits carrying a system frame number SFN and the HFI.

Alternatively, after receiving the first synchronization signal block and/or the second synchronization signal block, the terminal demodulates the received first synchronization signal block and/or second synchronization signal block, and determines the polarization direction of the first synchronization signal block and/or the polarization direction of the second synchronization signal block.

In some optional embodiments, the terminal determines the polarization direction of the first synchronization signal block and/or the polarization direction of the second synchronization signal block based on the primary synchronization signal PSS.

Alternatively, the terminal performs PSS sequence detection based on a PSS generator polynomial corresponding to an antenna polarization direction used when receiving the SSB; or performs PSS sequence detection based on a PSS sequence initial value corresponding to an antenna polarization direction used when receiving the SSB.

For example, the terminal knows the antenna polarization direction used when receiving the SSB, such as RHCP, and then when the terminal performs PSS sequence detection, a local PSS sequence uses a generator polynomial $x^{7}+x+1$ to perform subsequent detection. When successfully decoding the PBCH, the terminal can determine the polarization direction of the SSB.

In some optional embodiments, the terminal determines the polarization direction of the first synchronization signal block and/or the polarization direction of the second synchronization signal block based on the secondary synchronization signal SSS.

Alternatively, the terminal performs SSS sequence detection based on an SSS sequence initial value corresponding to an antenna polarization direction used when receiving the SSB.

In some optional embodiments, the terminal determines the polarization direction of the first synchronization signal block and/or the polarization direction of the second synchronization signal block based on the MIB.

Alternatively, the terminal determines the polarization direction of the first synchronization signal block and/or the polarization direction of the second synchronization signal block based on a 1-bit spare bit in the MIB or a value of the PDCCH-ConfigSIB1 field.

In some optional embodiments, the terminal determines the polarization direction of the first synchronization signal block and/or the polarization direction of the second synchronization signal block based on the SSB index. For example, an even index corresponds to LHCP, and an odd index corresponds to RHCP.

Furthermore, LHCP SSB and RHCP SSB use different index sets, and their corresponding relationship can be pre-defined or pre-configured. When the terminal receives the SSB signal and detects the SSB index, it can know the polarization direction of the SSB. The terminal knows the polarization direction used when receiving the SSB, and then subsequently determines the polarization direction according to the detected SSB index; or the terminal receives the SSB again on the SSB occasion of another polarization direction, and detects other relevant system information.

In some optional embodiments, the terminal determines the polarization direction of the first synchronization signal block and/or the polarization direction of the second synchronization signal block base on some bits in 8-bit physical layer information carried by the PBCH. The some bits include: half frame indicator HFI, or other bits other than information bits carrying a system frame number SFN and the HFI.

Other bits other than information bits carrying a system frame number SFN and the HFI include $\bar{a}_{\overline{A}+5}$, $\bar{a}_{\overline{A}+6}$ or $\bar{a}_{\overline{A}+7}$.

In the synchronization signal block transmission method provided by the embodiments of this application, a polarization direction indicator is carried through SSB transmission, so that the terminal can determine the polarization direction used in the subsequent transmission process.

Optionally, the first time interval is determined in a predefined or preconfigured manner.

Alternatively, the synchronization signal block transmission method provided by the embodiments of this application is the same as that described in the corresponding embodiment above, and can achieve the same technical effect. The difference is only that the executive body is different. The same part and beneficial effect in this embodiment and the corresponding embodiment above will not be described in detail.

Optionally, the size of the first time interval is one of the following:
  a positive integer greater than or equal to 0, where a unit is slot, subframe, or orthogonal frequency division multiplexing OFDM symbol;
  a radio frame;
  one of {5 ms, 10 ms, 20 ms, 40 ms, 80 ms, 160 ms}; and
  a configured SSB period.

Alternatively, the synchronization signal block transmission method provided by the embodiments of this application is the same as that described in the corresponding embodiment above, and can achieve the same technical effect. The difference is only that the executive body is different. The same part and beneficial effect in this embodiment and the corresponding embodiment above will not be described in detail.

Optionally, the synchronization signal block transmission method further includes:
  determining a beam ID or a bandwidth part BWP ID through the polarization direction and/or the SSB index.

Alternatively, the synchronization signal block transmission method provided by the embodiments of this application is the same as that described in the corresponding embodiment above, and can achieve the same technical effect. The difference is only that the executive body is different. The same part and beneficial effect in this embodiment and the corresponding embodiment above will not be described in detail.

It should be noted that, an execution subject of the synchronization signal block transmission method provided in the embodiments of this application may be the synchronization signal block transmission apparatus, or a control module in the synchronization signal block transmission apparatus configured to execute the synchronization signal block transmission method. In the embodiments of this application, an example in which the synchronization signal block transmission method is performed by the synchronization signal block transmission apparatus is used to describe the synchronization signal block transmission apparatus provided in the embodiments of this application.

FIG. 7 is a schematic structural diagram 1 of a synchronization signal block transmission apparatus according to an embodiment of this application. The apparatus includes: a first sending unit 710 and a second sending unit 720.

The first sending unit 710 is configured to send a first synchronization signal block in a first polarization direction on a first transmission occasion.

The second sending unit 720 is configured to send a second synchronization signal block in a second polarization direction after a first time interval.

The first polarization direction is different from the second polarization direction, and the first synchronization signal block and the second synchronization signal block contain the same information.

Optionally, the first polarization direction is left-hand circularly polarized LHCP, and the second polarization direction is right-hand circularly polarized RHCP; or
  the first polarization direction is right-hand circularly polarized RHCP, and the second polarization direction is left-hand circularly polarized LHCP.

Optionally, the same information includes at least one of the following:
  physical cell identifier PCI;
  at least some fields in a master information block MIB;
  at least a part of information in 8-bit physical layer information carried by a physical broadcast channel PBCH;
  synchronization signal block SSB index; and
  initial value used for initialization of a PBCH demodulation reference signal DMRS sequence.

Optionally, the polarization direction of the first synchronization signal block and the polarization direction of the second synchronization signal block are indicated by at least one of the following:
  primary synchronization signal PSS;
  secondary synchronization signal SSS;
  MIB;
  SSB index; and
  some bits in 8-bit physical layer information carried by a PBCH, where the some bits include: half frame indicator HFI, or other bits other than information bits carrying a system frame number SFN and the HFI.

Optionally, the first time interval is determined in a predefined or preconfigured manner.

Optionally, the size of the first time interval is one of the following:
  a positive integer greater than or equal to 0, where a unit is slot, subframe, or orthogonal frequency division multiplexing OFDM symbol;
  a radio frame;
  one of {5 ms, 10 ms, 20 ms, 40 ms, 80 ms, 160 ms}; and
  a configured SSB period.

Optionally, the apparatus further includes:
  a first determining unit, configured to determine a beam ID or a bandwidth part BWP ID through the polarization direction and/or the SSB index.

The synchronization signal block transmission method provided by the embodiment of this application transmits the synchronization signal block in different polarization directions on different transmission occasions, so that the SSB blind detection time can be reduced, ensuring that the terminal successfully receives the SSB signal within a certain period of time.

The synchronization signal block transmission apparatus in the embodiments of this application may be an apparatus, or may be a component, an integrated circuit, or a chip in a terminal. The apparatus may be a mobile terminal or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The synchronization signal block transmission apparatus in the embodiments of this application may be an apparatus with an operating system. The operating system may be an Android operating system, an iOS operating system, or another possible operating system. This is not specifically limited in the embodiments of this application.

The synchronization signal block transmission apparatus according to embodiments of the present disclosure can implement the processes in the method embodiments in FIG. 2 to FIG. 5, and achieve the same technical effect. To avoid repetition, details are not described herein again.

FIG. 8 is a schematic structural diagram 2 of a synchronization signal block transmission apparatus according to an embodiment of this application. The apparatus includes: a receiving unit 810, configured to receive a first synchronization signal block on a first transmission occasion; and/or configured to receive a second synchronization signal block on a second transmission occasion.

The first synchronization signal block and the second synchronization signal block contain the same information, a polarization direction of the first synchronization signal block is different from a polarization direction of the second synchronization signal block, and there is a first time interval between the first transmission occasion and the second transmission occasion.

Optionally, the polarization direction of the first synchronization signal block is left-hand circularly polarized LHCP, and the polarization direction of the second synchronization signal block is right-hand circularly polarized RHCP; or
    the polarization direction of the first synchronization signal block is right-hand circularly polarized RHCP, and the polarization direction of the second synchronization signal block is left-hand circularly polarized LHCP.

Optionally, the same information includes at least one of the following:
    physical cell identifier PCI;
    at least some fields in master information block MIB information;
    at least a part of information in 8-bit physical layer information carried by a physical broadcast channel PBCH;
    synchronization signal block SSB index; and
    initial value used for initialization of a PBCH demodulation reference signal DMRS sequence.
    Optionally, the apparatus further includes:
    a demodulation unit, configured to demodulate the first synchronization signal block and/or the second synchronization signal block; and
    a second determining unit, configured to determine the polarization direction of the first synchronization signal block and/or the polarization direction of the second synchronization signal block based on at least one of the following methods:
    primary synchronization signal PSS;
    secondary synchronization signal SSS;

MIB;
SSB index; and
some bits in 8-bit physical layer information carried by a PBCH, where the some bits include: half frame indicator HFI, or other bits other than information bits carrying a system frame number SFN and the HFI.
Optionally, the first time interval is determined in a predefined or preconfigured manner.
Optionally, the size of the first time interval is one of the following:
    a positive integer greater than or equal to 0, where a unit is slot, subframe, or orthogonal frequency division multiplexing OFDM symbol;
    a radio frame;
    one of {5 ms, 10 ms, 20 ms, 40 ms, 80 ms, 160 ms}; and
    a configured SSB period.
    Optionally, the apparatus further includes:
    a third determining unit, configured to determine a beam ID or a bandwidth part BWP ID through the polarization direction and/or the SSB index.
The synchronization signal block transmission method provided by the embodiment of this application transmits the synchronization signal block in different polarization directions on different transmission occasions, so that the SSB blind detection time can be reduced, ensuring that the terminal successfully receives the SSB signal within a certain period of time.

The synchronization signal block transmission apparatus in the embodiments of this application may be an apparatus, or may be a component, an integrated circuit, or a chip in a terminal. The apparatus may be a mobile terminal or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The synchronization signal block transmission apparatus in the embodiments of this application may be an apparatus with an operating system. The operating system may be an Android operating system, an iOS operating system, or another possible operating system. This is not specifically limited in the embodiments of this application.

The synchronization signal block transmission apparatus according to embodiments of the present disclosure can implement the processes in the method embodiments in FIG. 6, and achieve the same technical effect. To avoid repetition, details are not described herein again.

Figure 9:
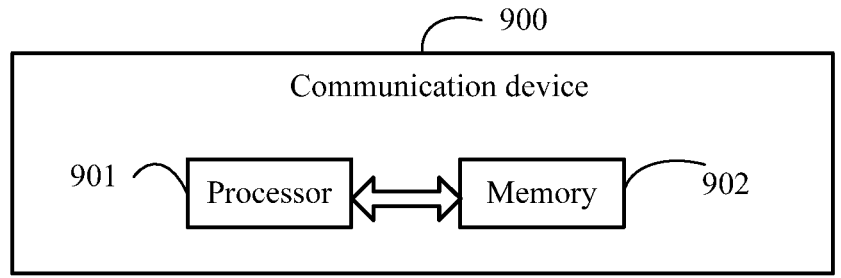
FIG. 9 is a schematic structural diagram of a communications device according to an embodiment of this application.

Optionally, as shown in FIG. 9, an embodiment of this application further provides a communication device 900, including a processor 901, a memory 902, and a program or an instruction stored in the memory 902 and executable on the processor 901. For example, when the communication device 900 is a terminal, when the program or instruction is executed by the processor 901, each process of the embodiment of the foregoing synchronization signal block transmission method is performed, and the same technical effect can be achieved. To avoid repetition, details are not repeated herein. When the communication device 900 is a network side device, when the program or instruction is executed by the processor 901, each process of the embodiment of the foregoing synchronization signal block transmission method is performed, and the same technical effect can be achieved. To avoid repetition, details are not repeated herein.

Figure 10:
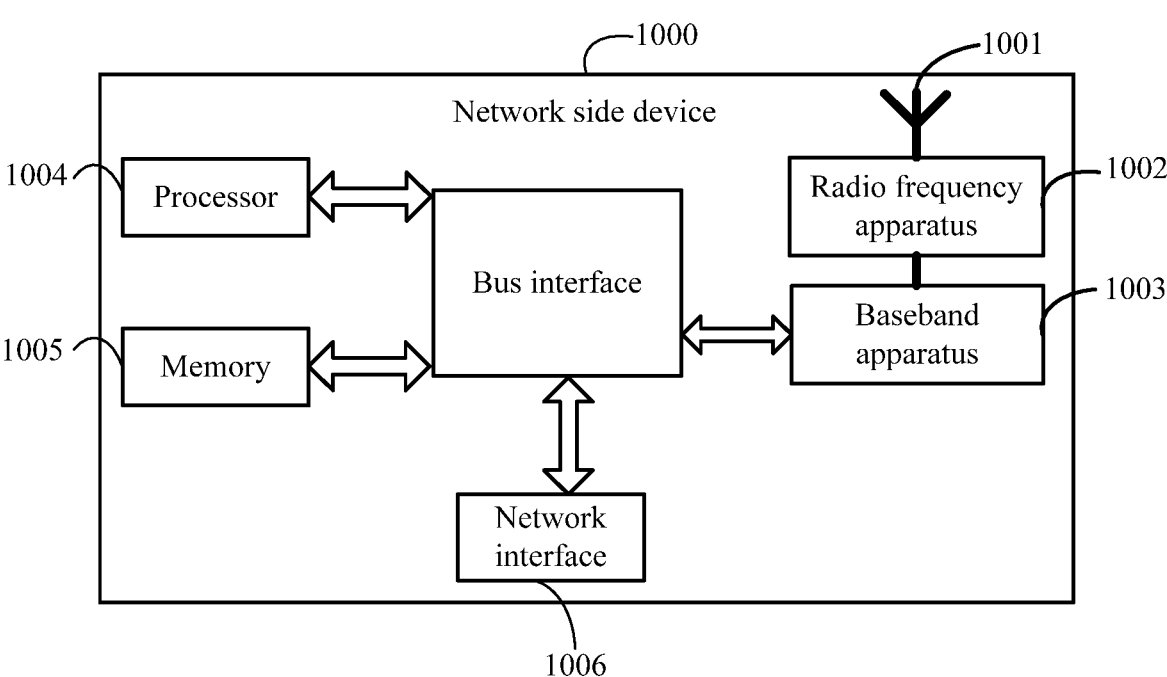
FIG. 10 is a schematic structural diagram of hardware of a network side device according to an embodiment of the application.

An embodiment of this application further provides a network side device. As shown in FIG. 10, the network device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and transmits the received information to the baseband apparatus 1003 for processing. In a downlink direction, the baseband apparatus 1003 processes information that needs to be sent, and sends processed information to the radio frequency apparatus 1002. The radio frequency apparatus 1002 processes the received information, and sends processed information by using the antenna 1001.

The foregoing synchronization signal block transmission apparatus may be located in the baseband apparatus 1003, and the method performed by the network side device in the foregoing embodiment may be implemented in the baseband apparatus 1003. The baseband apparatus 1003 includes a processor 1004 and a memory 1005.

The baseband apparatus 1003 may include, for example, at least one baseband board, where a plurality of chips are disposed on the baseband board. As shown in FIG. 10, one chip is, for example, the processor 1004, which is connected to the memory 1005, so as to invoke a program in the memory 1005 to perform operations of the network device shown in the foregoing method embodiment.

The baseband apparatus 1003 may further include a network interface 1006, configured to exchange information with the radio frequency apparatus 1002, where the interface is, for example, a common public radio interface (CPRI for short).

Alternatively, the network side device in this embodiment of the present invention further includes an instruction or a program stored in the memory 1005 and executable on the processor 1004. The processor 1004 invokes the instruction or the program in the memory 1005 to perform the method performed by the modules shown in FIG. 7, with the same technical effect achieved. To avoid repetition, details are not provided herein again.

Figure 11:
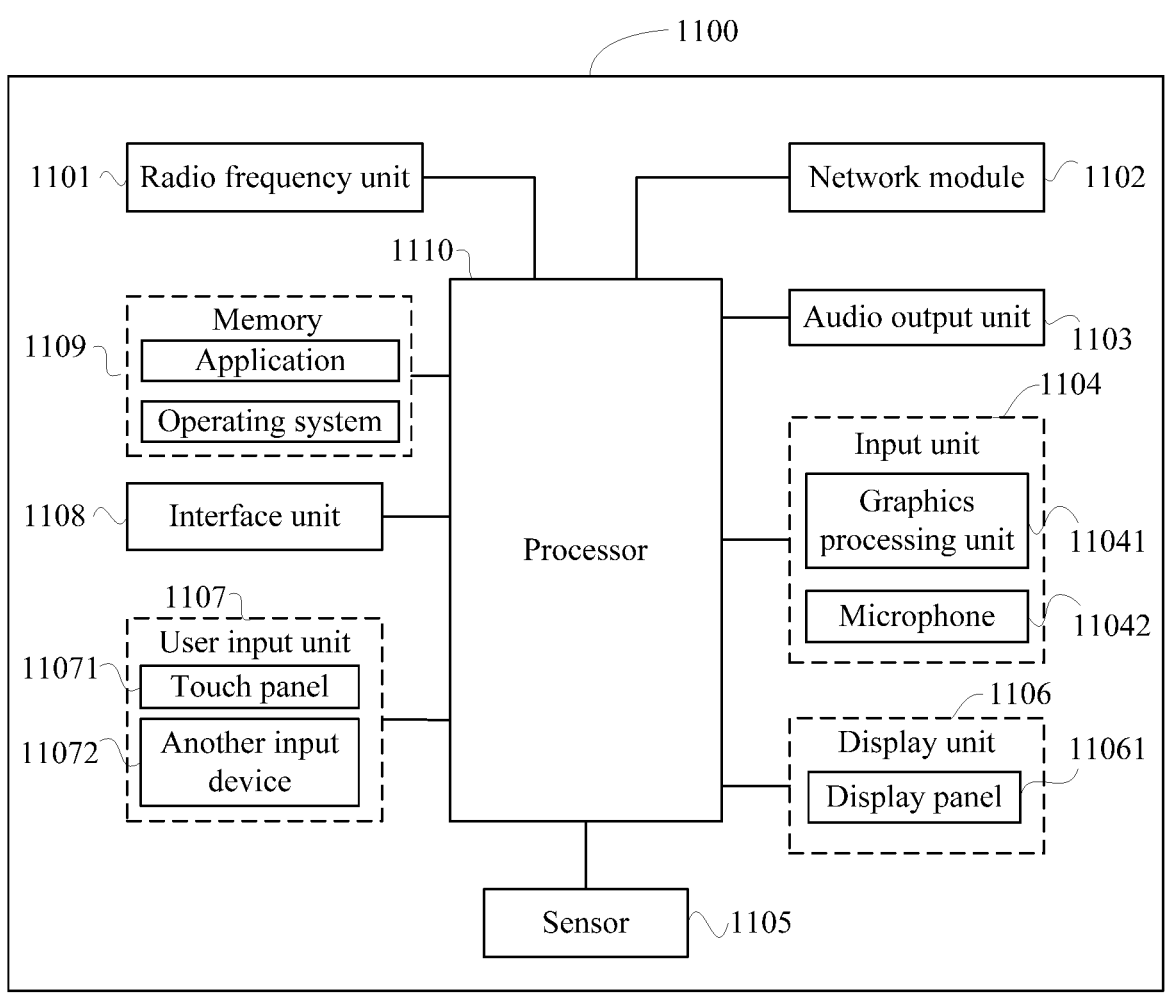
FIG. 11 is a schematic structural diagram of hardware of a terminal according to an embodiment of this application.

FIG. 11 is a schematic structural diagram of hardware of a terminal according to an embodiment of this application.

A terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

It may be understood by a person skilled in the art that the terminal 1100 may further include a power supply (such as a battery) that supplies power to each component. The power supply may be logically connected to the processor 1110 by using a power management system, to implement functions such as charging, discharging, and power consumption management by using the power management system. The terminal structure shown in FIG. 11 constitutes no limitation on the terminal, and the terminal may include more or fewer components than those shown in the figure, or combine some components, or have different component arrangements. Details are not described herein.

It should be understood that, in this embodiment of this application, the input unit 1104 may include a graphics processing unit (GPU) 11041 and a microphone 11042, and the graphics processing unit 11041 processes image data of a still picture or a video obtained by an image capture apparatus (such as a camera) in a video capture mode or an image capture mode. The display unit 1106 may include a display panel 11061, and the display panel 11061 may be configured in a form of a liquid crystal display, an organic light-emitting diode or the like. The user input unit 1107 includes a touch panel 11071 and another input device 11072. The touch panel 11071 is also referred to as a touchscreen. The touch panel 11071 may include two parts: a touch detection apparatus and a touch controller. The another input device 11072 may include, but is not limited to, a physical keyboard, function keys (such as a volume control key and a switch key), a trackball, a mouse, and a joystick. Details are not described herein.

In this embodiment of this application, the radio frequency unit 1101 receives downlink data from a network side device and then sends the downlink data to the processor 1110 for processing; and sends uplink data to the network side device. Usually, the radio frequency unit 1101 includes but is not limited to an antenna, at least one amplifier, a transceiver, a coupler, a low noise amplifier, a duplexer, and the like.

The memory 1109 may be configured to store a software program or an instruction and various pieces of data. The memory 1109 may mainly include a program or instruction storage area and a data storage area. The program or instruction storage area may store an operating system, and an application program or an instruction required by at least one function (for example, a sound playing function or an image playing function). In addition, the memory 1109 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage component, a flash memory component, or another non-volatile solid-state storage component.

The processor 1110 may include one or more processing units. Optionally, an application processor and a modem processor may be integrated into the processor 1110. The application processor mainly processes an operating system, a user interface, an application, an instruction, or the like. The modem processor mainly processes wireless communications, for example, a baseband processor. It can be understood that, alternatively, the modem processor may not be integrated into the processor 1110.

The radio frequency unit 1101 is configured to receive a first synchronization signal block on a first transmission occasion; and/or configured to receive a second synchronization signal block on a second transmission occasion.

The first synchronization signal block and the second synchronization signal block contain the same information, a polarization direction of the first synchronization signal block is different from a polarization direction of the second synchronization signal block, and there is a first time interval between the first transmission occasion and the second transmission occasion.

The terminal provided in the embodiments of this application can receive SSB signals from unknown polarization directions.

Optionally, the polarization direction of the first synchronization signal block is left-hand circularly polarized LHCP, and the polarization direction of the second synchronization signal block is right-hand circularly polarized RHCP; or the polarization direction of the first synchronization signal block is right-hand circularly polarized RHCP, and the polarization direction of the second synchronization signal block is left-hand circularly polarized LHCP.

Optionally, the same information includes at least one of the following:

physical cell identifier PCI;

at least some fields in master information block MIB information;

at least a part of information in 8-bit physical layer information carried by a physical broadcast channel PBCH;

synchronization signal block SSB index; and initial value used for initialization of a PBCH demodulation reference signal DMRS sequence.

Optionally, the processor 1110 is further configured to demodulate the first synchronization signal block and/or the second synchronization signal block; and determine the polarization direction of the first synchronization signal block and/or the polarization direction of the second synchronization signal block based on at least one of the following methods:

primary synchronization signal PSS;

secondary synchronization signal SSS;

MIB;

SSB index; and some bits in 8-bit physical layer information carried by a PBCH, where the some bits include: half frame indicator HFI, or other bits other than information bits carrying a system frame number SFN and the HFI.

Optionally, the first time interval is determined in a predefined or preconfigured manner.

Optionally, the size of the first time interval is one of the following:

a positive integer greater than or equal to 0, where a unit is slot, subframe, or orthogonal frequency division multiplexing OFDM symbol;

a radio frame;

one of {5 ms, 10 ms, 20 ms, 40 ms, 80 ms, 160 ms}; and a configured SSB period.

Optionally, the processor 1110 is further configured to:

determine a beam ID or a bandwidth part BWP ID through the polarization direction and/or the SSB index.

The terminal provided by the embodiment of this application transmits the synchronization signal block in different polarization directions on different transmission occasions, so that the SSB blind detection time can be reduced, ensuring that the terminal successfully receives the SSB signal within a certain period of time.

An embodiment of this application further provides a readable storage medium. The readable storage medium stores a program or an instruction, and when the program or the instruction is executed by a processor, each process of the embodiment of the foregoing synchronization signal block transmission method is performed and the same technical effects can be achieved. To avoid repetition, details are not described herein again.

The processor is a processor in the terminal in the foregoing embodiment. The readable storage medium includes a computer-readable storage medium such as a read-only memory (ROM), a random access memory (RAM), a magnetic disk, an optical disc, or the like.

An embodiment of this application further provides a chip, the chip includes a processor and a communication interface, the communication interface is coupled to the processor, and the processor is configured to run the program or instruction of the network side device to realize each process of the embodiment of the synchronization signal block transmission method, and can achieve the same technical effect. To avoid repetition, details are not repeated herein.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A synchronization signal block transmission method, comprising:

sending, by a network side device, a first synchronization signal block in a first polarization direction on a first transmission occasion; and sending, by the network side device, a second synchronization signal block in a second polarization direction after a first time interval;

wherein the first polarization direction is different from the second polarization direction, and the first synchronization signal block and the second synchronization signal block contain the same information;

wherein the first polarization direction is left-hand circularly polarized (LHCP), and the second polarization direction is right-hand circularly polarized (RHCP); or the first polarization direction is right-hand circularly polarized RHCP, and the second polarization direction is left-hand circularly polarized (LHCP);

wherein the first synchronization signal block and the second synchronization signal block both carry a polarization direction indicator, wherein the polarization direction of the first synchronization signal block and the polarization direction of the second synchronization signal block are indicated by at least one of the following:

master information block (MIB);

synchronization signal block (SSB) index; or some bits in 8-bit physical layer information carried by a physical broadcast channel (PBCH), wherein the some bits comprise: half frame indicator (HFI), or other bits other than information bits carrying a system frame number (SFN) and the HFI.

2. The synchronization signal block transmission method according to claim 1, wherein the same information comprises at least one of the following:

physical cell identifier (PCI);

at least some fields in the master information block (MIB);

at least a part of information in 8-bit physical layer information carried by the physical broadcast channel (PBCH);

the synchronization signal block (SSB) index, wherein the polarization direction of the first synchronization signal block and the polarization direction of the second synchronization signal block are not indicated by the SSB index; or initial value used for initialization of a PBCH demodulation reference signal (DMRS) sequence.

3. The synchronization signal block transmission method according to claim 1, wherein the polarization direction of the first synchronization signal block and the polarization direction of the second synchronization signal block are indicated further by at least one of the following:

primary synchronization signal (PSS);

secondary synchronization signal (SSS).

4. The synchronization signal block transmission method according to claim 1, wherein the first time interval is determined in a defined or preconfigured manner.

5. The synchronization signal block transmission method according to claim 1, wherein the size of the first time interval is one of the following:

a positive integer greater than or equal to 0, wherein a unit is slot, subframe, or orthogonal frequency division multiplexing (OFDM) symbol;

a radio frame;

one of {5 ms, 10 ms, 20 ms, 40 ms, 80 ms, 160 ms}; and a configured SSB period.

6. The synchronization signal block transmission method according to claim 1, further comprising:

determining, by the network side device, a beam ID or a bandwidth part (BWP) ID through the polarization direction and/or the SSB index.

7. A synchronization signal block transmission method, comprising:

receiving, by a terminal, a first synchronization signal block on a first transmission occasion; and/or receiving a second synchronization signal block on a second transmission occasion;

wherein the first synchronization signal block and the second synchronization signal block contain the same information, a polarization direction of the first synchronization signal block is different from a polarization direction of the second synchronization signal block, and there is a first time interval between the first transmission occasion and the second transmission occasion;

wherein the first polarization direction is left-hand circularly polarized (LHCP), and the second polarization direction is right-hand circularly polarized (RHCP); or the first polarization direction is right-hand circularly polarized RHCP, and the second polarization direction is left-hand circularly polarized (LHCP);

wherein the first synchronization signal block and the second synchronization signal block both carry a polarization direction indicator, wherein the method further comprises:

demodulating, by the terminal, the first synchronization signal block and/or the second synchronization signal block; and determining, by the terminal, the polarization direction of the first synchronization signal block and/or the polarization direction of the second synchronization signal block based on at least one of the following:

master information block (MIB);

synchronization signal block (SSB) index; or some bits in 8-bit physical layer information carried by a physical broadcast channel PBCH), wherein the some bits comprise: half frame indicator (HFI), or other bits other than information bits carrying a system frame number (SFN) and the HFI.

8. The synchronization signal block transmission method according to claim 7, wherein the same information comprises at least one of the following:

physical cell identifier (PCI);

at least some fields in master information block (MIB) information;

at least a part of information in 8-bit physical layer information carried by the physical broadcast channel (PBCH);

the synchronization signal block (SSB) index, wherein the polarization direction of the first synchronization signal block and/or the polarization direction of the second synchronization signal block are not determined based on the SSB index; or initial value used for initialization of a PBCH demodulation reference signal (DMRS) sequence.

9. The synchronization signal block transmission method according to claim 7, wherein the polarization direction of the first synchronization signal block and/or the polarization direction of the second synchronization signal block are determined further based on at least one of the following:

primary synchronization signal (PSS);

secondary synchronization signal (SSS).

10. The synchronization signal block transmission method according to claim 7, wherein the first time interval is determined in a defined or preconfigured manner.

11. The synchronization signal block transmission method according to claim 7, wherein the size of the first time interval is one of the following:

a positive integer greater than or equal to 0, wherein a unit is slot, subframe, or orthogonal frequency division multiplexing (OFDM) symbol;

a radio frame;

one of {5 ms, 10 ms, 20 ms, 40 ms, 80 ms, 160 ms}; and a configured SSB period.

12. The synchronization signal block transmission method according to claim 7, further comprising:

determining, by the terminal, a beam ID or a bandwidth part (BWP) ID through the polarization direction and/ or the SSB index.

13. A network side device, comprising:

a processor; and a memory storing a program or an instruction that is executable on the processor, wherein the program or instruction, when executed by the processor, causes the network side device to:

send a first synchronization signal block in a first polarization direction on a first transmission occasion; and send a second synchronization signal block in a second polarization direction after a first time interval;

wherein the first polarization direction is different from the second polarization direction, and the first synchronization signal block and the second synchronization signal block contain the same information;

wherein the first polarization direction is left-hand circularly polarized (LHCP), and the second polarization direction is right-hand circularly polarized (RHCP); or the first polarization direction is right-hand circularly polarized RHCP, and the second polarization direction is left-hand circularly polarized (LHCP);

wherein the first synchronization signal block and the second synchronization signal block both carry a polarization direction indicator, wherein the polarization direction of the first synchronization signal block and the polarization direction of the second synchronization signal block are indicated by at least one of the following:

master information block (MIB));

synchronization signal block (SSB) index; or some bits in 8-bit physical layer information carried by a physical broadcast channel (PBCH), wherein the some bits comprise: half frame indicator (HFI), or other bits other than information bits carrying a system frame number (SFN) and the HFI.

14. The network side device according to claim 13, wherein the same information comprises at least one of the following:

physical cell identifier (PCI);

at least some fields in the master information block (MIB);

at least a part of information in 8-bit physical layer information carried by the physical broadcast channel (PBCH);

the synchronization signal block (SSB) index, wherein the polarization direction of the first synchronization signal block and the polarization direction of the second synchronization signal block are not indicated by the SSB index; or initial value used for initialization of a PBCH demodulation reference signal (DMRS) sequence.

15. The network side device according to claim 13, wherein the polarization direction of the first synchronization signal block and the polarization direction of the second synchronization signal block are indicated further by at least one of the following:

primary synchronization signal (PSS);

secondary synchronization signal (SSS).

16. The network side device according to claim 13, wherein the program or instruction, when executed by the processor, further causes the network side device to:

determine a beam ID or a bandwidth part (BWP) ID through the polarization direction and/or the SSB index.

17. A terminal, comprising:

a processor; and a memory storing a program or an instruction that is executable on the processor, wherein the program or instruction, when executed by the processor, causes the terminal to perform the synchronization signal block transmission method according to claim 7.

\* \* \* \* \*